United States Patent [19]  [11] 3,829,114
Cohen et al.  [45] Aug. 13, 1974

[54] SHOPPING CART WITH ARTICLE STORAGE PREVENTING MEANS UNDER BASKET

[75] Inventors: Harold Cohen, Scotch Plains; William L. Noto, Maplewood, both of N.J.

[73] Assignee: Shop-Rite Supermarkets, Inc., Elizabeth, N.J.

[22] Filed: Mar. 2, 1973

[21] Appl. No.: 337,382

[52] U.S. Cl. ........................................ 280/33.99 R
[51] Int. Cl. ............................................ B62b 11/00
[58] Field of Search...280/33.99 R, 33.99 A, 33.99 B, 280/33.99 C, 33.99 F, 33.99 H, 33.99 S, 33.99 T; 293/48, 49

[56] References Cited
UNITED STATES PATENTS

| | | | |
|---|---|---|---|
| 320,657 | 6/1885 | Hoesl | 293/48 |
| 1,713,445 | 5/1929 | Persons | 293/48 |
| 2,918,294 | 12/1959 | Hennion | 280/33.99 |
| 3,051,936 | 8/1962 | Finger et al. | 280/33.99 A X |
| D155,971 | 11/1949 | Concklin | 280/33.99 X |

Primary Examiner—Kenneth H. Betts
Assistant Examiner—David M. Mitchell
Attorney, Agent, or Firm—Lerner, David, Littenberg & Samuel

[57] ABSTRACT

An improved nestable shopping cart is provided which includes a frame assembly upon which a basket is supported and includes means for obstructing the area under the basket so that it is substantially impossible to carry groceries, other articles, shopping bags and the like below the basket and out of view from the check-out cashier. The obstructing means for obstructing the area under the basket comprises a plurality of elongated members secured to the frame assembly below the basket in a manner such as to provide a barrier which blocks off and thus prevents storage of such articles in the area below the basket and also forms a plurality of planes skewed in such a manner so that none of such planes alone or in any combination is capable of supporting and retaining the usual supermarket merchandise or shopping bags thereon. Furthermore, the above described shopping cart is still capable of nesting with other similar type carts notwithstanding the presence of such obstructing means.

14 Claims, 9 Drawing Figures

SHOPPING CART WITH ARTICLE STORAGE PREVENTING MEANS UNDER BASKET

FIELD OF INVENTION

The present invention relates to an improved nestable shopping cart which is designed to prevent storage and retention of articles thereon below the view of the check-out cashier.

BACKGROUND OF THE INVENTION

In today's large supermarket type retail establishments, use of shopping carts has become essential for providing efficient movement of goods from the shelves on which they are stored, to the check-out cashier, and usually to the automobile in which they are eventually carried away. Although such carts are relatively small, a very large number thereof are required in the operation of a supermarket. Accordingly, such carts take up a good deal of space, particularly in cart storage areas such as inside and outside the market near the front entrance thereto. In order to somewhat alleviate the above-described space problem, carts which are designed to nest, that is carts which may be stored in telescoped relation with respect to each other, are usually employed. Examples of nesting or telescoping shopping carts are disclosed in U.S. Pat. Nos. 2,583,514 to Maslow; 2,903,269 and 2,918,294 to Hennion; 2,958,536 to Young; and 2,596,775 to Kasper.

Shopping carts such as those described in the above patents as well as other conventional nestable and non-nestable carts are constructed with lower storage baskets or trays which are positioned below a main basket or, alternatively, they are constructed with lower rail arrangements which are capable of supporting and retaining groceries, shopping bags or other articles. Although such areas add to the storage capacity of the carts, unfortunately, when the cart is positioned in the conventional restricted aisle alongside a check-out cashier, the aisle obscures the view of the cashier so that the cashier cannot readily see the merchandise stored below the main basket. Accordingly, it is not infrequent that merchandise stored in lower baskets, on lower trays or on lower rails is overlooked and not charged out by the cashier. In fact, it has been found that such lower baskets, trays and/or rails as well as any areas below the main basket and capable of supporting and retaining merchandise are often employed by would-be pilferers in attempting to remove merchandise from the store without paying.

It has been estimated that the amount of merchandise pilfered in large supermarket type stores can run from 0.5 to 5 percent of the gross sales thereof. A large percentage of this amount is believed to be the result of storing merchandise in shopping carts in a manner such that the check-out cashier will overlook such merchandise.

In accordance with the present invention, there is provided an improved shopping cart, which includes nestable shopping carts, which overcomes the disadvantages of prior art shopping carts described above. The improved shopping cart of the invention is designed to be nestable as well as to prevent storage and retention of merchandise, shopping bags and the like in the area below the main basket of said cart and out of direct view of the check-out cashier.

BRIEF DESCRIPTION OF THE INVENTION

The shopping cart of the invention comprises a vertically disposed frame assembly which includes an upper portion and a bottom portion, a basket mounted on the upper portion so as to provide an open area between the bottom of the basket and the bottom portion of the frame assembly, and obstructing means disposed within the open area so that articles cannot be stored in the open area and on the bottom portion of the frame assembly. The obstructing means are so shaped and positioned that the cart will nest with identical shopping carts.

In a preferred embodiment of the shopping cart of the invention, the obstructing means comprise strut members, the strut members being secured at one end to the bottom portion of the frame assembly substantially adjacent to the outer perimeter thereof, and being secured at the other end to the frame assembly at positions above the bottom portion of the frame assembly, whereby adjacent strut members cooperate to define juxtaposed downwardly directed planes. Each of these planes alone or in combination with other such planes defines surfaces which are substantially incapable of supporting and retaining articles thereon.

As will be seen hereinafter, the obstructing means employed in the shopping cart of the invention can take substantially any form so long as such means define a series of planes which obstruct the open space or area between the bottom of the basket and the bottom portion of the shopping cart, such planes being incapable of supporting and retaining articles thereon.

DETAILED DESCRIPTION OF THE INVENTION

Figure 1:
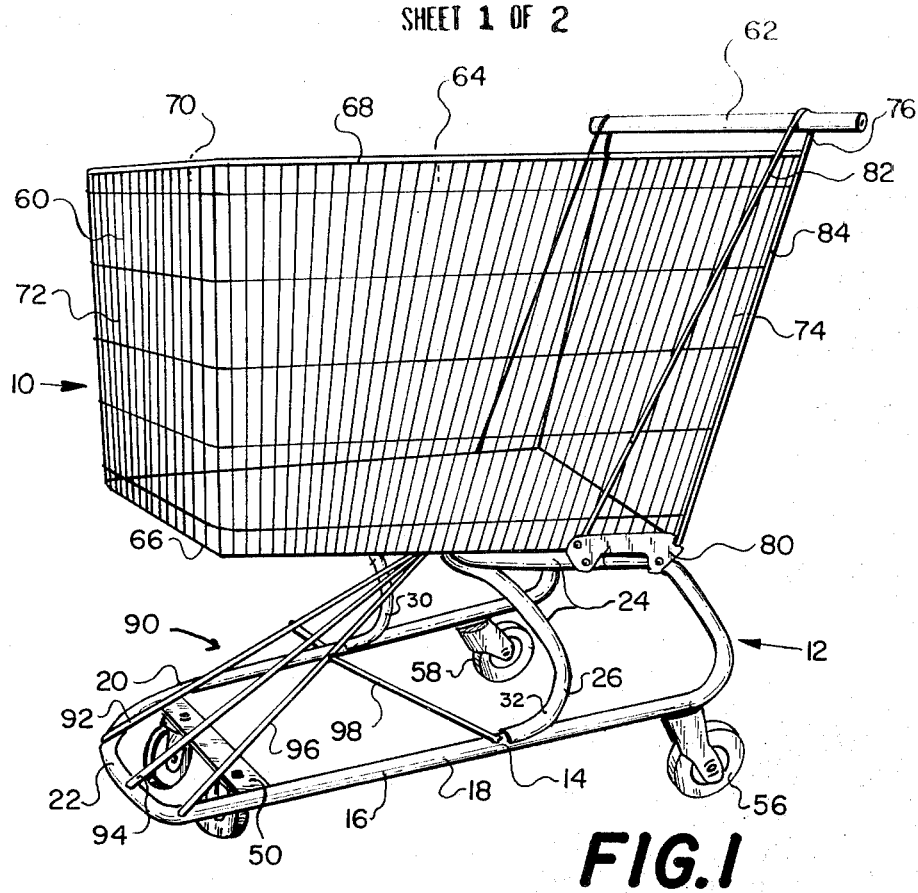
FIG. 1 is a perspective view of a shopping cart, which includes a preferred embodiment of obstructing means, in accordance with the present invention.
Figure 2:
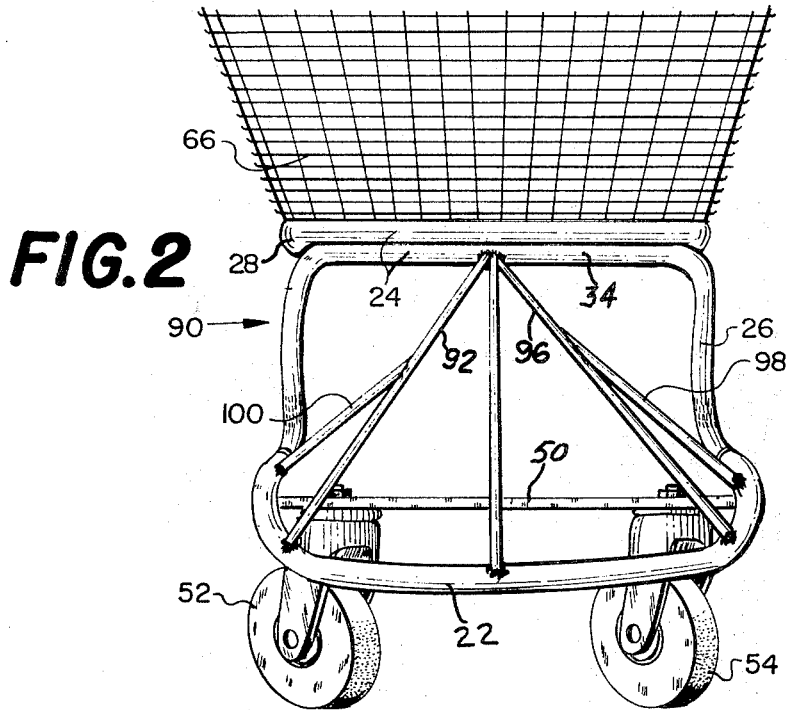
FIGS. 2 and 2A are front and back views of the shopping cart shown in FIG. 1.
Figure 2A:
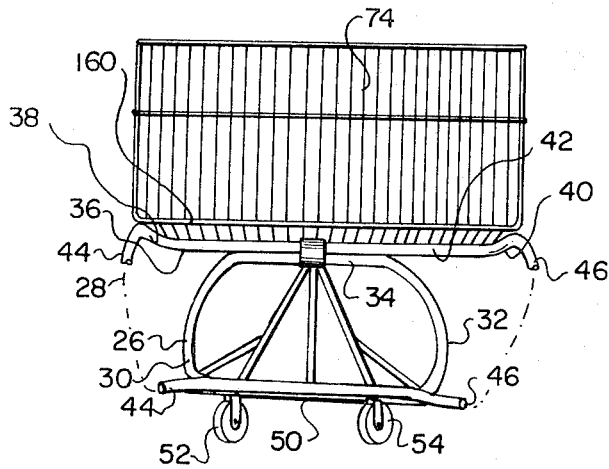

Referring to the accompanying Figures, wherein like numerals represent like parts in the several views, FIG. 1 illustrates a nestible shopping cart which is generally designated by the numeral 10. The shopping cart 10 includes a frame assembly generally designated by the numeral 12 which includes a bottom portion 14 which is defined by U-shaped member 16 which includes side legs 18 and 20 and horizontal leg 22. The frame assembly also includes basket support member 24 which comprises a pair of substantially U-shaped tubular members 26 and 28, as shown in FIGS. 1 to 2A. Member 26 comprises a U-shaped portion 1 which includes legs 30 and 32, which are secured to legs 18 and 20, respectfully, of the bottom portion of the frame assembly 12, and horizontal portion 34 which is integral with legs 30 and 32, as shown.

Member 28 comprises an upper U-shaped portion 36 which includes side legs 38 and 40 which are integral with horizontal leg 42. The legs 38 and 40 are secured to end portions of legs 18 and 20, respectively, of the bottom portion of the frame assembly by means of tubular connecting members 44 and 46 as shown. In a preferred embodiment, the member 26 is of one piece tubular construction and the member 28 is also of one piece tubular construction, the tubular members being suitably bent to form the appropriate U-shaped members as shown in the Figures.

As shown in FIG. 1 cross member 50 is secured to legs 18 and 20 of the bottom portion of the frame assembly and wheels 52 and 54 are pivotably secured to said cross member 50. Backwheels 56 and 58 are mounted on the rear portions of legs 18 and 20 of the bottom portion of the frame assembly as shown.

Basket 60 is mounted on the U-shaped portion of member 28, as shown, with the horizontal leg 42 of member 28 being supported by the horizontal leg 34 of member 26. The basket 60 includes a handle portion 62 which is mounted on container portion 64, such container including bottom or base 66, side walls 68 and 70, front wall 72 and back wall 74. The back wall 74 is pivotably mounted at its upper portion, immediately below the handle 62, that is at portion 76 as shown in FIG. 1, so that the back wall 74 may be pivoted about point 76 and the bottom thereof moved toward the central portion of the basket so that nesting with another cart may be effected.

As shown, the basket is secured to the U-shaped portion of the member 36 by means of a pair of brackets 80, one of which is shown, and cooperating strut members 82 and 84 which are looped over the handle 62 as shown in FIG. 1. It will be understood that another pair of strut members 82, 84 is preferably present on the other side of the basket 60 so as to secure and retain the basket in place on the U-shaped portion of the member 28.

Obstructing means generally referred to by the numeral 90 is positioned in the space defined by the bottom 66 of the basket and the bottom portion 14 of the frame assembly. As shown in FIGS. 1, 2 and 2A, the obstructing means 90 comprises a plurality of strut members, 92, 94 and 96, one end of each of said strut members being secured to the U-shaped portion 34 of support member 26, said strut members fanning out so that the other end of each of said members is secured to the horizontal leg 22 of the bottom portion 14 of the frame assembly. Side strut members 98 and 100 are secured to strut members 96 and 92, respectively at one end thereof and the other end thereof is secured to legs 18 and 20, respectively, of the bottom portion of the frame assembly.

As can be seen in FIGS. 1, 2, and 2A, the obstructing means 90 generally obstructs and blocks off the space between the bottom of the basket and the bottom portion of the frame assembly and forms cooperating planes which are juxtaposed and are downwardly directed so that each of said planes alone or in combination with other such planes cooperate to define surfaces which are substantially incapable of supporting and retaining articles thereon. Furthermore, no two juxtaposed planes cooperate to provide a common support surface.

The obstructing means 90 may take other forms such as shown in FIGS. 3 through 8. The essential consideration with respect to all forms of obstructing means which may be employed in the shopping cart of the present invention, including those shown in the Figures as well as others, is that such means must obstruct the space defined by the bottom of the basket and the bottom of the frame assembly. Furthermore, such obstructing means must form a plurality of surfaces or planes which are all downwardly directed so that such surfaces are incapable of supporting and retaining objects thereon. In addition, it is essential that the obstructing means be designed so that they do not interfere with the nesting capability of the shopping cart with another shopping cart of identical or similar design and construction.

Figure 3:
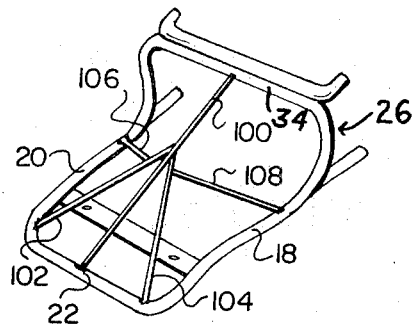
FIGS. 3 through 8 are front perspective views of various embodiments of obstructing means which can be employed in the shopping cart of the invention.

The obstructing means shown in FIG. 3 comprise a plurality of strut members, wherein a central strut member 100 is secured to the horizontal portion 34 of the U-shaped member of member 26. The other end of strut 100 is secured to leg 22 of the bottom portion of the frame assembly as shown. Struts 102 and 104 are each secured at one end to strut 100 as shown. The other ends of struts 102 and 104 fan out and are secured to the leg 22 of the bottom portion of the frame assembly. In addition, side struts 106 and 108 are secured at one end to struts 102 and 104, respectively, and are secured at the other end to legs 20 and 18, respectivley, of the bottom portion of the frame assembly.

Figure 4:
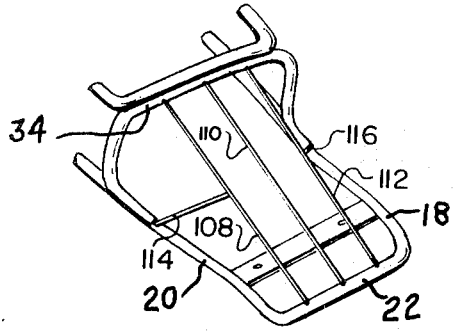

In FIG. 4, obstructing means are shown which comprise a plurality of struts, such as struts 108, 110 and 112, one end of each of which is secured to leg 34 of the member 26 and the other leg of which is secured to leg 22 of the bottom portion of the frame assembly. Side struts 114 and 116 are secured to struts 108 and 112, respectively, and to legs 20 and 18, respectively, of the bottom portion of the frame assembly.

Figures 5, 6:
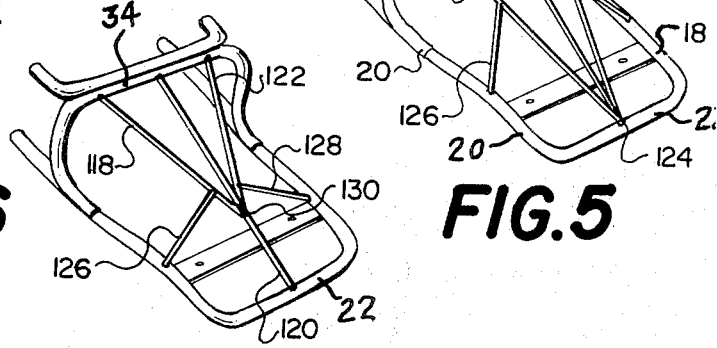

In FIG. 5, obstructing means are shown which comprise a plurality of struts, including struts 118, 120 and 122, all of which are secured at one end to portion 124 of leg 22 of the bottom portion of the frame assembly and which fan out and are secured to and along leg 34 of the member 26. Side struts 126 and 128 are secured to struts 118 and 122, respectively, and to legs 20 and 18, respectively, of the bottom portion of the frame assembly.

The obstructing means shown in FIG. 6 are similar to that shown in FIG. 5 with the exception that struts 118 and 122 are secured to strut 120 at area 130, as shown.

Figure 7:
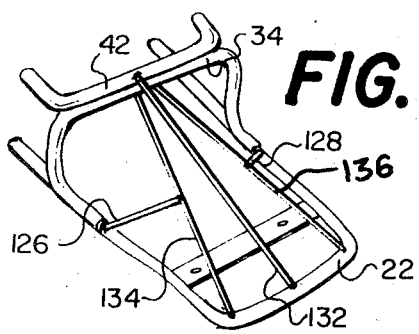

In FIG. 7, obstructing means are shown wherein strut 132 is secured to leg 42 of the member 28 and to leg 22 of the bottom portion of the frame assembly. Struts 134 and 136 are secured to leg 34 of the member 26 at a point below that at which the strut 132 is secured to leg 42 and the other ends of struts 134 and 136 fan out away from strut 132 and are secured to leg 22 of the bottom portion of the frame assembly, as shown.

In the embodiments of the obstructing means shown in FIGS. 3, 6 and 7, all planes formed by the combinations of the strut members are downwardly directed and are arranged so that no two juxtaposed planes cooperate to provide a common support surface and all planes are directed downwardly from the central strut 100 (FIG. 3), 120 (FIG. 6), and 132 (FIG. 7).

Figure 8:
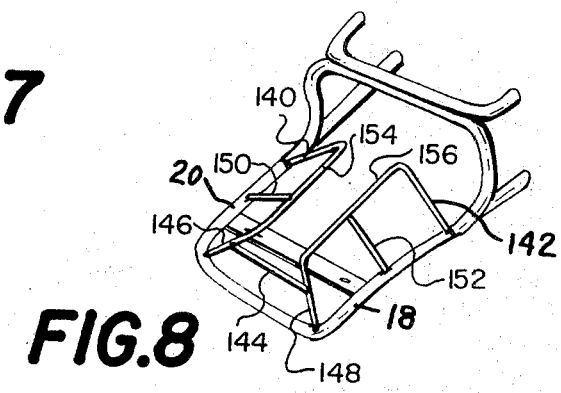

Another embodiment of the obstructing means is shown in FIG. 8 wherein the obstructing means comprise a pair of inverted U-shaped members 140 and 142; each end of member 140 and each end of member 142 is secured to the leg 20 and leg 18, respectively, of the bottom portion of the frame assembly, as shown. Cross member 144 is secured to legs 146 and 148 of the U-shaped members 140 and 142 so as to close off the front portion or the space between such U-shaped members. Furthermore, side struts 150 and 152 are secured to horizontal leg 154 and 156 of the members 140 and 142, respectively, so as to close off the inner areas of members 140 and 142. The vertical legs and horizontal legs 154 and 156 of the members 140 and 142 should extend a sufficient distance toward the bottom of the basket so that there is insufficient room to store an article above legs 154 and 156 and below the bottom of the basket.

In each of the embodiments of the obstructing means shown, it is essential that the uppermost portion of the obstructing means does not extend above the edge 160 of the bottom portion 66 or the back portion 74 of the basket, so as to insure that the shopping cart of the invention will be nestable with identical or similar shopping carts.

It will be appreciated by those skilled in the art that other obstructing means arrangements are possible to close off the space between the bottom of the basket and the bottom portion of the frame assembly. For example, additional strut members may be employed in conjunction with the struts shown in the various embodiments of the Figures. Two or more side struts may be secured to struts 92 and 96 of FIG. 1, struts 102 and 104 of FIG. 3, struts 108 and 112 of FIG. 4, struts 126 and 128 of FIGS. 5 and 6, and struts 134 and 136 of FIG. 7. Furthermore, additional struts may be secured to and between legs 42 and 34 of members 28 and 26, respectively, and the bottom portion of the frame assembly.

It would also be appreciated that any conventional basket, which preferably is nestable, may be employed in the shopping cart of the invention. Furthermore, other frame assemblies may be employed in conjunction with such baskets as will be apparent to those skilled in the art.

The shopping cart of the invention may be nested with other identical or similar carts provided that the obstructing means are positioned as described above and that the baskets permit succeeding baskets to be projected into each other.

It will also be apparent that the bottom portion of the frame assembly may be a solid member, in which case, the strut members secured thereto would be preferably secured to the perimeter of the solid member.

The shopping cart of the present invention is particularly advantageous in that the obstructing means thereof may be provided in substantially any conventional nestable shopping cart simply by welding the various strut members to the shopping carts in the areas described above. Further such strut members may be curved or bowed.

While the baskets used in the shopping cart of the invention are preferably formed of heavy wire, they may also be formed of flexible netting, fabric or other material. Furthermore, any suitable basket pivoting devices may be employed to insure that the back wall of the basket pivots at an upper portion so that the basket is of the nesting type. Furthermore, the basket may be secured by any conventional means to the frame assembly.

Although the foregoing specification has disclosed presently preferred embodiments of the invention, it is not to be inferred that the invention is limited thereby to the embodiments thus disclosed by way of example, and it will be understood that the invention embraces all such modifications and changes in the parts and in the construction combination and arrangement of parts as shall come within the purview of the following claims.

What is claimed is:

1. A shopping cart comprising a frame assembly, at least three rollers for movably supporting said frame assembly, said frame assembly including lower support means rotatably mounting said rollers in positions such that they are horizontally spaced from each other when the shopping cart is in its normal operative position, said lower support means including a U-shaped rearwardly diverging interconnecting strengthening means which interconnect said rollers and define a plane which is substantially horizontally disposed when the shopping cart is in its normal operative position, a basket, said frame assembly including cantilevered basket support means mounting said basket thereon in a position disposed above and spaced from said plane, said basket and frame assembly being adapted to nest with a similar shopping cart, and article storage preventing means connected to said frame assembly and disposed within the space between said basket and said plane, said article storage preventing means comprising strut means connected to said interconnecting strengthening means and arranged to extend generally upwardly and rearwardly, said strut means cooperating with the bight and the diverging legs of said U-shaped interconnecting strengthening means to prevent the support of bulky articles on said interconnecting strengthening means by prohibiting their admission to said plane from the front and sides of said shopping cart, and said article storage preventing means are so shaped and positioned that such shopping carts can be nested together.

2. A shopping cart in accordance with claim 1, wherein said strut means comprises a plurality of elongated members, said elongated members are secured to said frame assembly so as to form a plurality of downwardly directed planes, and the surfaces defined by such planes are so disposed that they do not cooperate with each other to provide cooperating supporting or retaining surfaces for articles.

3. A shopping cart in accordance with claim 1, wherein said strut means comprises a first strut member, a first end of which is secured to said frame assembly at a point disposed substantially adjacent to the bottom of said basket, the other end of which is secured to said interconnecting strengthening means, and said strut means comprises at least second and third strut members, at least one of said second and third strut members being disposed on either side of said first strut members, a first end of each of said second and third strut members is secured to said frame assembly at points disposed substantially adjacent to the bottom of said basket and below the point at which said first strut member is secured to said frame assembly, and the other end of each of said second and third strut members is secured to said interconnecting strengthening means.

4. A shopping cart in accordance with claim 3, wherein said strut means includes at least fourth and fifth strut members, a first end of each of said fourth strut member and of said fifth strut member is secured to a portion of said second strut member and said third strut member, respectively, and the other ends of said fourth and fifth strut members are secured to said interconnecting strengthening means.

5. A shopping cart in accordance with claim 1, wherein said strut means comprises a first strut member, a first end of which is secured to said frame assembly at a point disposed substantially adjacent to the bottom of said basket, the other end of which is secured to said interconnecting strengthening means, and said strut means comprises at least second and third strut members, at least one of said second and third strut members being disposed on either side of said first strut member, a first end of each of said second and third strut members is secured to a portion of said first strut member spaced from the ends thereof, and the other ends of said second and third strut members are secured to said interconnecting strengthening means.

6. A shopping cart in accordance with claim 5, wherein said strut means includes at least fourth and fifth strut members, a first end of said fourth strut member and of said fifth strut member is secured to a portion of said second strut member and said third strut member, respectively, and the other ends of said fourth and fifth strut members are secured to said interconnecting strengthening means.

7. A shopping cart in accordance with claim 1, wherein the rotatably mounted rollers includes a pair of spaced front rollers, said interconnecting strengthening means includes an elongated front member connecting said front rollers together, said strut means comprises a first series of strut members, one end of each of said first series of strut members is connected to said elongated front member, and the other end of each of said first series of strut members is connected to said frame assembly at positions disposed above said elongated front member and displaced rearwardly therefrom so that the first series of strut members are disposed in downward directions directed towards said elongated front member.

8. A shopping cart in accordance with claim 7, wherein the rotatably mounted rollers includes a pair of spaced back rollers, one of each of said pair of front rollers and one of each of said pair of back rollers are disposed on opposite sides of the cart, said interconnecting strengthening means includes a pair of elongated side members, one of said elongated side members connects one front and back roller on one side of the cart together, the other of said elongated side members connects one front and back roller on the other side of the cart together, and said strut means comprises a second series of strut members including at least one strut member connected at one end to said one of said elongated side members and at least one strut member connected at one end to said other of said elongated side members, and the other ends of said second series of strut members are connected to said first series of strut members at points disposed above said pair of elongated side members when the shopping cart is in its normal operative position.

9. A shopping cart in accordance with claim 1, wherein said artilce storage preventing means comprise a plurality of strut members, said strut members are secured at one end to said lower support means at positions disposed substantially adjacent to the front of said shopping cart, and said strut members are secured at their other ends to said frame assembly at positions displaced from the front of said shopping cart and above said lower support means when the shopping cart is in its normal operative position so that adjacent strut members cooperate to define juxtaposed downwardly directed planes.

10. A shopping cart in accordance with claim 9, wherein said strut members are so arranged that no two juxtaposed planes cooperate to provide a common support surface.

11. A shopping cart in accordance with claim 10, wherein said strut members comprise a first series of struts, one end of each of said first series of struts are connected to a common area of said frame assembly disposed immediately below and substantially adjacent to said basket, each of said first series of struts being angled downwardly and fanning out from each other, and the other end of each of said first series of struts are connected at spaced points to said lower support means.

12. A shopping cart in accordance with claim 11, wherein said strut members include a second series of struts, one end of each of said second series of struts is connected to a strut of said first series of struts, and the other end of each of said second series of struts is connected to said interconnecting strengthening means so that said second series of struts are disposed between said first series of struts and said plane.

13. A shopping cart in accordance with claim 12, wherein at least some of said strut members of said first series of struts are curved.

14. A shopping cart in accordance with claim 12, wherein said first series of struts comprises three struts and said second series of struts comprises two struts.

* * * * *